United States Patent [19]

Manneschi

[11] Patent Number: 5,406,259

[45] Date of Patent: Apr. 11, 1995

[54] HIGH UNIFORMITY METAL DETECTOR EQUIPPED WITH AUXILIARY RECEIVER COILS SENSITIVE TO METAL MASSES PASSING CLOSE TO THEM

[75] Inventor: Giovanni Manneschi, Arezzo, Italy

[73] Assignee: C.E.I.A. - Costruzioni Elettroniche Industriali Automatismi - S.p.A., Civitella in Val di Chiana, Italy

[21] Appl. No.: 53,380

[22] Filed: Apr. 19, 1993

[30] Foreign Application Priority Data

Nov. 19, 1992 [IT] Italy .............................. AR92A0027

[51] Int. Cl.⁶ ............................................ G08B 13/26
[52] U.S. Cl. .................................. 340/561; 340/572; 324/239
[58] Field of Search ............... 340/561, 568, 941, 572; 324/239, 234, 226, 262, 225

[56] References Cited

U.S. PATENT DOCUMENTS

| | | | |
|---|---|---|---|
| 3,758,849 | 9/1973 | Susman et al. | 324/225 |
| 3,764,860 | 10/1973 | Scheda | 324/239 X |
| 4,075,553 | 2/1978 | Bouverot et al. | 340/941 X |
| 4,274,090 | 6/1981 | Cooper | 340/568 X |
| 4,779,048 | 10/1988 | Aichele | 324/239 X |
| 4,949,037 | 8/1990 | Abe | 324/239 X |

FOREIGN PATENT DOCUMENTS 1216946 2/1987 Italy .

Primary Examiner—Victor R. Kostak
Assistant Examiner—John W. Miller
Attorney, Agent, or Firm—Young & Thompson

[57] ABSTRACT

A perfected metal detector for passageways, equipped with transmitter-receiver Tx-Rx windings connected, using suitable amplifiers A and D, to an Analysis and Control Logic Unit LAC where the signals are compared; and also equipped with at least one corrective receiver winding CC on each side of a supervised passage used to supply information to the LAC unit about metal bodies in transit along paths close to it, with the aim of rendering uniform the interceptive sensivity throughout the transit area, even when more than one metal body is in simultaneous transit.

7 Claims, 2 Drawing Sheets

HIGH UNIFORMITY METAL DETECTOR EQUIPPED WITH AUXILIARY RECEIVER COILS SENSITIVE TO METAL MASSES PASSING CLOSE TO THEM

BACKGROUND OF THE INVENTION

1. Field of the Invention

The invention relates to a perfected Metal Detector for passageways, to be used at the entrances of premises needing protection from the admission of armed persons and for other uses connected with the interception of metal objects.

2. Description of Prior Art

In existing passageway Metal Detectors, the transit of a metal body inside the supervised area causes variations in the signals induced on the receiver windings which depend on the path taken by this object.

If held in the same position, the object in transit will cause different induced signals as its transit path moves from the center of the passageway,—where the weakest signals are induced,—and approaches the lateral panels or columns in the proximity of which the signals induced reach a maximum strength.

This lack of uniformity in detection as the path of the object or objects varies is a serious drawback because, once established the strength of the induced signal of the smallest object detected under the worst conditions (that is along a path towards the center of the supervised passageway), every induced signal of equal or superior strength must be detected, and therefore those produced by much smaller objects than that established as having the minimum detection will not be detected, when in transit in the vicinity of the transducers housed in the sides of the passageway.

All this causes numerous false alarms that reduce notably the flow of people in the supervised passageway and could lead to the controllers reducing the sensitivity of the unit to cut down on the number of false alarms.

These disadvantages have been confronted with the invention subject of Italian Patent No. 1216946, in the name of Giovanni Manneschi, inventor of the current invention, in which reference is made to a single, disturbing metal body in transit in the supervised entrance. In accordance with this invention, two receiver transmitter units are used, with one unit's receiver and the other unit's transmitter placed on the same side of the passageway, so that, working alternately, the passage of the disturbing metal body induces two signals on the two receivers that are of a strength that is in proportion to the eccentricity of the object's path within the passageway.

This makes it possible for an analysis and control circuit, via the comparison of the received induced signals, to make the necessary corrections so that the effects of the metal body's passage are rendered virtually independent from the eccentricity of its path and thus heighten considerably the device's discriminatory powers. This system therefore provides a correct response in every case of a single metal object in transit; on the other hand, in the case of the simultaneous passage of two metal bodies, one close to one panel, the other close to the opposite panel, or anyway at a close distance from one transducer section and the other from the other section, regardless of the structure and arrangement of these sections, the system gives surprising signal variations in signal on the receiver windings that are virtually identical to each other and in size are equal to the induced signal caused by the passage of a single metal object that is, however, much larger than the two preceding ones, in transit in the center of the supervised entrance.

Therefore, the simultaneous passage of two small metal bodies, such as keys and/or coins, along two paths next to transducers placed on the sides of the supervised passage, produces an effect comparable to that produced by a weapon in transit along a path in the center of the same supervised passage.

In the case of the simultaneous transit of two bodies, the invention described in Pat. No. 1,216,946 is therefore unable to interpret the phenomenum correctly and provide a correction of the reception sensitivity of the single receiver windings because, unable to comprehend the phenomenum, if the correction was to take place it would also be applied to the passage of a single mass in the center of the entrance.

SUMMARY OF THE INVENTION

The aim of the current invention is the perfection of the device subject of Italian Patent no. 1216946, namely the realization of a device capable of evaluating whether the disturbance of the signal induced on the receiver units is to be attributed to the passage of a single metal body or to the simultaneous passage of more than one metal object, some or all of which are next to the transducers on the sides of the supervised entrance.

The aim of this is to carry out a correct discrimination between small and large objects and therefore to make the right corrections, that is to say, apply suitable corrective coefficients that make the sensitivity for interception uniform throughout the transit area, even when more than one metal body is passing through along any path.

Basically, the invention that makes it possible to overcome the aforementioned drawbacks comprises one or more Transmitter units and one or more Receiver units placed at the sides of the supervised area, connected, using suitable amplifiers, to an analysis and control Logic Unit, where the signals in question are compared and their strengths are taken into account; lastly, it includes at least one auxiliary receiver winding on each side of the supervised passageway used to provide information to the Logic Unit about metal bodies in transit along paths near this winding, with the aim of facilitating the correct interpretation of the induced signals and consequently the application of corrective coefficients which would render uniform the sensitivity for interception throughout the entire transit way, even when more than one metal body is in simultaneous transit.

The invention thus perfected is able to distinguish between the disturbance caused by the passage of a single metal body and that caused by the simultaneous passage of more different objects and therefore to perform the ideal corrections to make uniform the reception sensitivity as the path of the object or objects in transit varies.

BRIEF DESCRIPTION OF THE DRAWINGS

The invention which gives these results is described in detail below with reference to practical exemplary embodiments reproduced in simplified form with block diagrams on the attached sheet, where.

Figure 1:
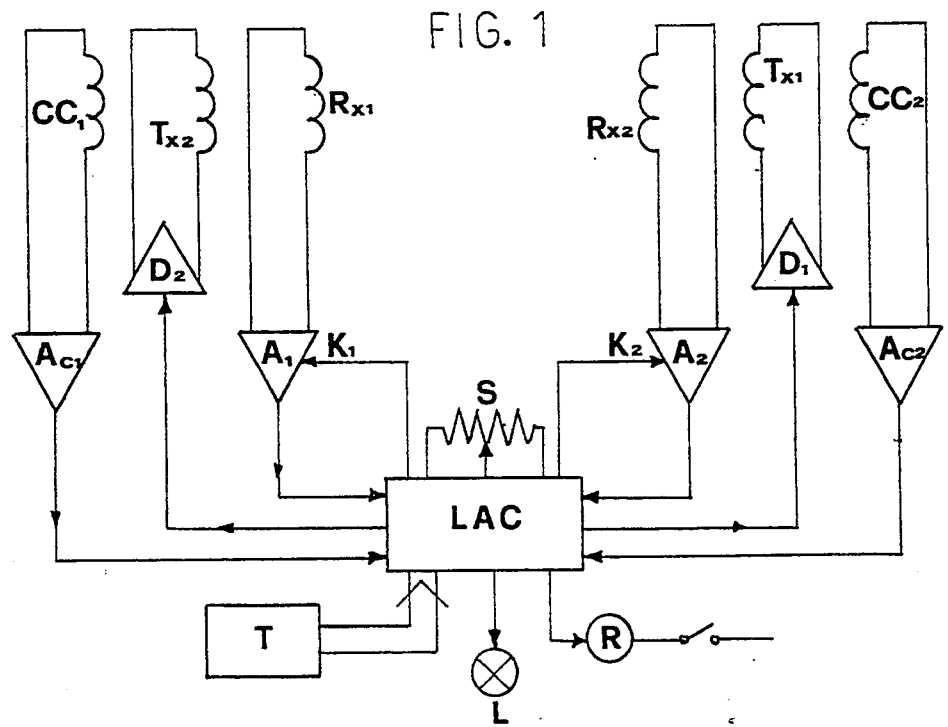
FIG. 1 exemplifies the invention in the form of a solution where there is one transmitter winding, one receiver winding and one corrective receiver winding housed on each side of the passageway.

It is understood that the drawings serve to illustrate the invention with the sole aim of aiding its comprehension.

DESCRIPTION OF THE PREFERRED EMBODIMENTS

In these drawings, the letters LAC stand for the Logic Unit for Analysis and Control; $T_{x1}$ and $T_{x2}$ are the two transmitter windings, $R_{x1}$ and $R_{x2}$ are the corresponding receiver windings; $CC_1$, $CC_2$, $CC_3$ and $CC_4$ are the corrective receiver windings; $A_1$, $A_2$, $D_1$ and $D_2$ are the amplifier units of which the first two operate on the signals coming from $R_{x1}$ and $R_{x2}$, and the second two on the signals sent to $T_{x1}$ and $T_{x2}$; $A_{c1}$, $A_{c2}$, $A_{c3}$ and $A_{c4}$ show the amplifier group that operates on the signals induced on the corrective receiver windings; $K_1$ and $K_2$ are the coefficients which are used to correct the strength of the f.e.m.i. on the $R_{x1}$ and $R_{w2}$ windings on the passage of metal bodies in the supervised way of transit; S represents the sensitivity adjuster; T, L and R are external units that are interfaced with the LAC unit which controls the functional and operative logic of the Metal Detector.

In one embodiment, the Detector consists of two pairs of windings, each of which is made up of a transmitter and a receiver placed facing each other in the supervised passageway, there being one transmitter and one receiver on each side. Each pair has a corrective receiver winding CC. Each of these windings can be held in place by its own support which can take any shape or structure. Those placed on each side can be adjacent to each other or even partially or totally on top of each other, with either a flat or panel shaped structure and shape or column-shape or otherwise. The windings of each pair can have a single pole or multiple poles; they can be positioned equally, or crossed over each other or placed in another way being usually staggered.

The corrective receiver windings are shaped so that they are able to receive only variations induced on the passage of metal bodies near the transducer unit that houses them, ignoring their passage through the center or along the side of the transducer opposite.

The corrective windings are placed one or more on each side of the passageway, usually on the $T_x$, $R_x$ or $T_x$–$R_x$ windings of the same section.

Basically, therefore, the invention includes two transducer sections placed at the sides of the supervised entrance, each having one or more corrective receiver winding CC designed so that each one is able to receive only E. M. F. variations induced on the passage of metal bodies in proximity to it and to ignore those bodies passing towards the center of the supervised area or near the facing section.

The two transducer sections positioned at the sides of the supervised entrance in one constructive solution each consist of at least one transmitter winding $T_x$, at least one receiver winding $R_x$ and at least one corrective winding CC connected via the amplification unit to the Logic Unit LAC that controls and analyses the signals for processing.

In another solution one of the two windings sections has two transmitter windings $T_x$ and at least one corrective receiver winding CC, whereas the other has two receiver windings $R_x$ and at least one corrective receiver winding CC without the respective $T_x$ and $R_x$ windings coinciding.

Generally these are two or more $T_x$ sections and two or more $R_x$ sections, (however positioned at the sides of the supervised passage), having one or more corrective winding CC on each side of the passage.

When in function, the passage of a metal body in the supervised way of transit causes an alteration in the electromagnetic fields produced by $T_{x1}$ and $T_{x2}$ with the consequent generation of two signals induced on the $R_{x1}$ and $R_{x2}$ windings. The comparison of these by the Logic Unit LAC determines the value of corrective coefficients $K_1$ and $K_2$ to be applied so that the signals arriving at the LAC are equal to each other and to those that would have arrived if the metal body had followed a path along the center of the supervised passage.

If the path described by the disturbing object is very eccentric the corrective receiver winding close to the body in transit intervenes and confirms the eccentricity of its passage to the LAC unit.

When the disturbance induced on $R_{x1}$ and $R_{x2}$ is due to separate bodies in simultaneous transit, the LAC unit can receive signals from one or both corrective receiver windings, on which, if one or both the bodies in transit passes close by, signals are induced.

By analyzing these signals the LAC unit can deduce the geometrical distribution of the bodies in transit and therefore apply the corrective coefficients $K_1$ and $K_2$ to the signals induced on $R_{x1}$ and $R_{x2}$ so they can value the correct signals and therefore, according to the sensitivity level programmed by the operator, can activate or not the signalling unit for the alarm.

The signals induced on the $CC_1$ and $CC_2$ windings in FIG. 1, are influenced by the orientation of the particular path of the disturbing body in transit near them.

For this, in an alternative solution, each corrective winding of FIG. 1 could be replaced by a pair of windings positioned differently in relation to each other and/or staggered, becoming, in this way, sensitive to the close passage of the disturbing body whatever its shape, orientation or direction.

Figure 2:
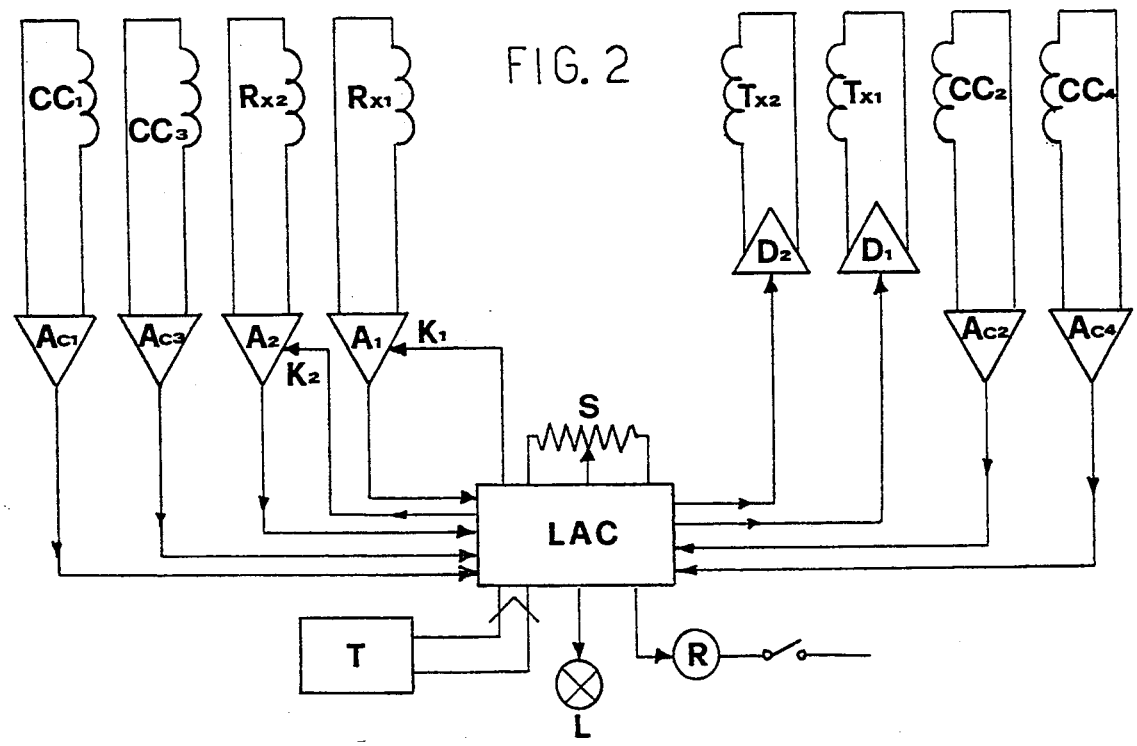
FIG. 2 exemplifies the invention in the form of a solution where there are two transmitter windings housed on one side of the passageway, two receiver windings housed on the other side and lastly, two corrective receiver windings on each side.
Figure 3:
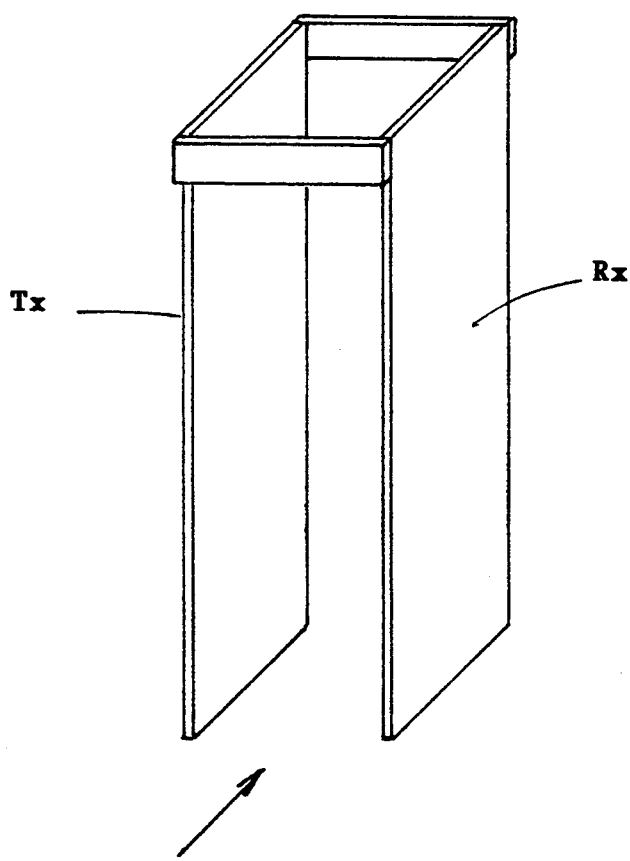
FIG. 3 is a drawing showing a metal detector according to the present invention showing the location of the transmitter $T_x$ windings and the receiver $R_x$ windings. The arrow shows the entrance of the supervised area between $T_x$ and $R_x$.

The practical solution shown in FIG. 2 exemplifies an embodiment consisting of two winding sections placed at the sides of the supervised area, one of which comprises two transmitter windings $T_x$ and two corrective receiver windings CC, the other, two receiver windings $R_x$ and two corrective receiver windings CC, without the respective $T_x$ and $R_x$ windings coinciding and, usually, with the corrective receiver windings staggered on each side.

This solution offers advantages when, for example, the detector is installed in the presence of a source of disturbance on the side where the $T_x$ windings are to be placed.

In both solutions two receiver-transmitter units are needed, positioned differently to render at least one of them more sensitive to the passage of the object whatever its orientation, while, if they are multipolar, they will usually have a differing number of poles to suppress the interaction of signals induced from objects in transit at differing heights from the ground which could, in such a position, reduce the resulting signals on each $R_x$ winding.

I claim:

1. Metal detector for detecting metal objects within a supervised area to be used at entrances of premises needing protection from an admission of armed persons and for other uses connected with an interception of metal objects, comprising at least one transmitter unit $T_x$ and at least one receiver unit $R_x$ placed on each side of said supervised area, each connected through amplifiers to a logic unit for analysis and control LAC where signals induced by a perturbation of a magnetic field within said supervised area are measured and compared wherein said metal detector further comprises at least one corrective receiver winding CC on each side of said supervised area, said at least one corrective receiver winding CC being used to provide information to said LAC unit about metal bodies in transit along paths close to said at least one corrective winding CC, said signals induced in said at least one corrective winding CC facilitating an application of suitable corrective coefficients K which render an interception sensitivity of said metal detector uniform throughout said supervised area by adjusting a gain of an amplifier amplifying signals induced within said at least one receiver unit $R_x$, even when more than one metal body is in simultaneous transit.

2. Metal detector as claimed in claim 1, wherein two transducer sections are placed on each side of said supervised area, each having said at least one corrective receiver winding CC designed so that each one of said corrective receiver windings CC is able to receive only E. M. F. variations induced by a passage of metal bodies in close proximity to said at least one corrective receiver winding CC, and to ignore those bodies passing towards a center of said supervised area or near an entrance of said supervised area.

3. Metal detector as claimed in claim 1, wherein transducer sections positioned at each side of said supervised area each comprise said at least one transmitter winding $T_x$, said at least one receiver winding $R_x$, and said at least one corrective receiver winding CC connected via amplification units to said LAC which controls and analyses said induced signals for processing.

4. Metal detector as claimed in claim 1, wherein said metal detector comprises at least two $T_x$ sections and at least two $R_x$ sections, and said at least one corrective receiver winding CC on each side of said supervised area.

5. Metal detector as claimed in claim 1, wherein said metal detector comprises two winding sections, one section positioned at each side of said supervised area, a first one of said sections comprising two transmitter windings $T_x$ and said at least one corrective receiver winding CC, and a second one comprising two receiver windings $R_x$ and said at least one corrective receiver winding CC.

6. Metal detector as claimed in claim 1, wherein said metal detector comprises two winding sections, one section positioned at each side of said supervised area, each of said winding sections comprising two corrective receiver windings CC partially overlapping each other.

7. Metal detector as claimed in claim 1, wherein said metal detector comprises two winding sections, one section positioned at each side of said supervised area, each comprising said at least one corrective receiver winding CC overlapping said $R_x$, $T_x$, or $T_x$-$R_x$ windings of a same section.

* * * * *